United States Patent
Lipohar et al.

[11] Patent Number: 5,947,657
[45] Date of Patent: Sep. 7, 1999

[54] DRILL JIG ASSEMBLY HAVING HYDRAULIC CHUCK AND DRILL GUIDE WITH PILOT BORE

[75] Inventors: Steve P. Lipohar, Derry, Pa.; William C. Magill, Mentor, Ohio; William B. Tunis, Puyallup, Wash.

[73] Assignee: Kennametal Inc., Latrobe, Pa.

[21] Appl. No.: 09/134,395

[22] Filed: Aug. 14, 1998

[51] Int. Cl.[6] ................................................. B23B 39/00
[52] U.S. Cl. ................................. 408/97; 279/20; 408/59
[58] Field of Search ............................. 408/57, 59, 111, 408/137, 97; 279/4.03, 20

[56] References Cited

U.S. PATENT DOCUMENTS

| | | | |
|---|---|---|---|
| 2,791,922 | 5/1957 | Robinson | 408/137 |
| 2,860,531 | 11/1958 | Groff | 408/111 |
| 3,371,560 | 3/1968 | Kaser . | |
| 3,512,433 | 5/1970 | Juhasz et al. | 408/137 |
| 3,516,681 | 6/1970 | Cox et al. | 279/4.03 |
| 3,905,718 | 9/1975 | Luckenbill et al. | 408/111 |
| 4,027,992 | 6/1977 | Mackey, Sr. et al. . | |
| 4,096,608 | 6/1978 | Lagerstedt . | |
| 4,108,567 | 8/1978 | Faber | 408/224 |
| 4,375,341 | 3/1983 | Schulze . | |
| 4,605,345 | 8/1986 | Giughese . | |
| 5,286,042 | 2/1994 | Laube | 279/4.03 |
| 5,429,376 | 7/1995 | Mueller et al. | 279/4.03 |
| 5,584,618 | 12/1996 | Blankenship et al. . | |
| 5,630,682 | 5/1997 | Davey . | |
| 5,697,737 | 12/1997 | Danielsson et al. . | |

FOREIGN PATENT DOCUMENTS 307668  3/1929  United Kingdom .

*Primary Examiner*—Andrea L. Pitts
*Assistant Examiner*—Adesh Bhargava
*Attorney, Agent, or Firm*—Larry R. Meenan

[57] ABSTRACT

A drill jig assembly for accurately supporting a drill relative to a workpiece is provided that includes a drill having a cylindrical shank, a chuck having a cylindrical exterior, and a hydraulically-operated collet for detachably gripping the drill shank, a housing tube for slidably and rotatably supporting the cylindrical exterior of the chuck, and a drill guide mounted on the distal end of the housing tube. The drill guide is formed from a carbide bushing having a pilot bore for rotatably receiving the cylindrical shank of the drill and maintaining a pilot concentric alignment between the bushing and the shank during a drilling operation. The use of hydraulic chuck in combination with the pilot bore of the carbide bushing allows the drill to accurately bore holes in a workpiece to very tight tolerances in a one-step, extend and retract drilling operation.

20 Claims, 3 Drawing Sheets

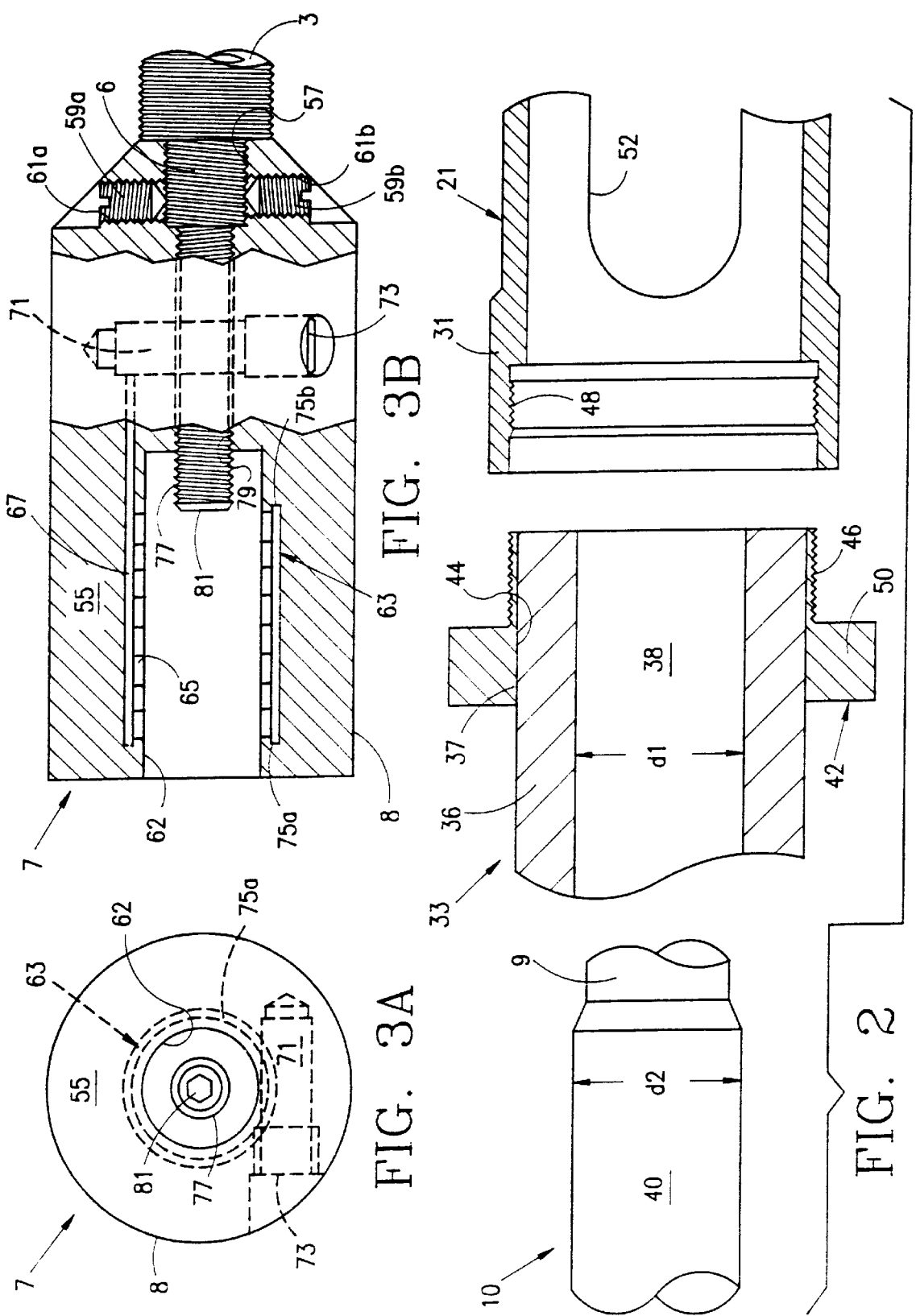

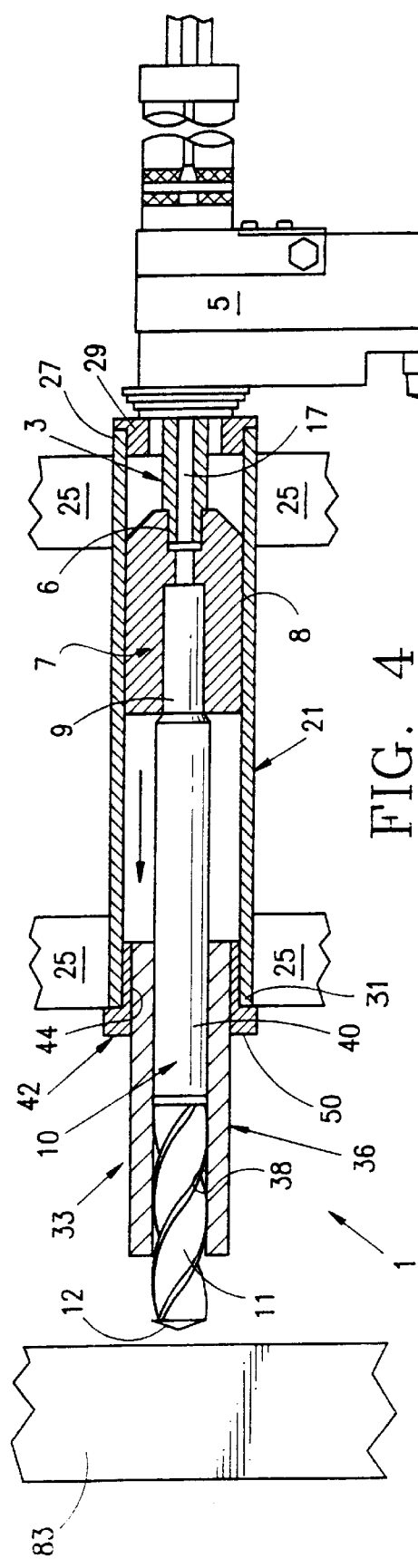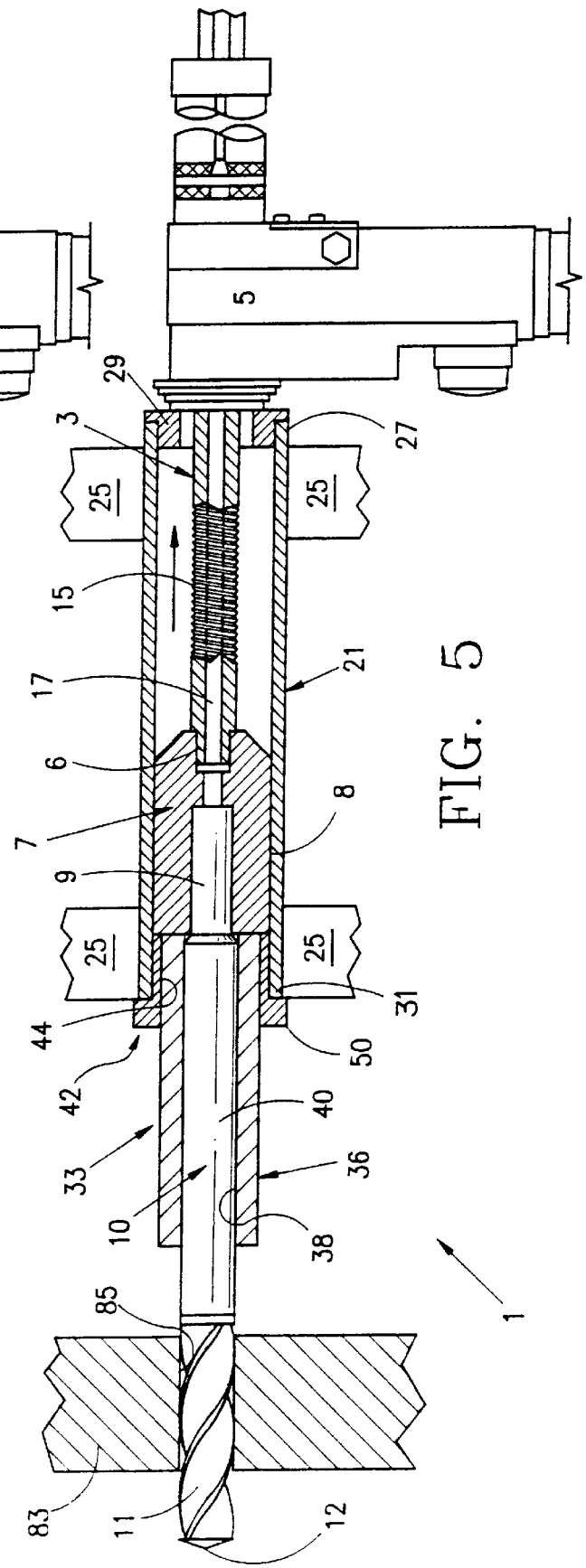

DRILL JIG ASSEMBLY HAVING HYDRAULIC CHUCK AND DRILL GUIDE WITH PILOT BORE

BACKGROUND OF THE INVENTION

This invention generally relates to drill jigs, and is specifically concerned with a drill jig that utilizes a hydraulic chuck in combination with a drill guide having a pilot bore to accurately drill holes to tight tolerances.

Jigs for guiding drills to perform precision boring operations are well known in the prior art. Such jigs are frequently used in the manufacture of commercial jetliners where the assembly of a single wing requires the boring of 1.5 million holes through various aluminum and titanium components. These prior art jigs are used in combination with precision made fixtures to accurately place the tip end of a drill along the center line of a desired bore location, and then to extend and retract a rotating drill in order to create a bore of the desired diameter in concentric alignment with the desired location.

One of the drill jigs presently used in the manufacture of airliner wings comprises a rotatable spindle connected on one end to the output shaft of an air motor, and to the shank of a drill at the other end. The spindle is concentrically arranged within a housing tube (or nosepiece as it is known in the art). The housing tube is stationarily coupled to the motor casing. To provide a means for advancing and retracting the drill, a screw thread is provided around the exterior of the spindle. The screw thread on the spindle is engaged to a screw thread provided around the inner diameter of a gear driven by the motor.

In operation, a fixture connected to the housing tube moves the jig into precise coaxial alignment with the center line of the situs of the desired bore. Next, the air motor is actuated to rotate the drill at the desired rpm. The pitch of the screw thread around the spindle is dimensioned such that the drill advances at the desired feed rate per revolution, which is slow enough for the cutting edges on the tip end of the drill to cleanly cut and remove material through the aluminum or titanium workpiece. Once the bore has reached the desired depth, the air motor is stopped and reversed so that the screw thread on the spindle acts to withdraw the drill from the hole.

Unfortunately, such a jig structure has proven inadequate for the production of the high-precision bores required in the manufacture of the flap-track of a commercial jetliner. Such bores must be drilled to a very tight tolerance, with a run-out (i.e., slight conical tapering of the bore due to off-center wobbling of the drill) of only plus or minus 0.004 inches. Because such jigs cannot initially produce a bore to within such tight tolerances, the bores must be drilled under-sized, and then precision enlarged by way of a special reaming operation to bring them within the required tolerances. The production of such precision bores is essential in such aeronautical components, as such components are subjected to constant vibration in use, which can cause premature metal fatigue if the components forming the wings and other parts of the aircraft are not precision-fitted. However, while the drilling step takes only a short time, the additionally-required precision reaming step is many times longer, thus substantially increasing the manufacturing time for the production of each precision bore around the flap track. Still another shortcoming associated with the prior art jig design is that it is compatible for use with only specially manufactured drills that have a shrink-fitted Morse taper at the end of their shanks for coupling with the threaded end of the spindle. The installation of a Morse taper and machining of the bore for the screw-type coupling not only creates opportunities for unwanted non-concentricities to form between the spindle and the drill, but renders the changing of a worn drill bit with a new one an awkward and time consuming operation, as much of the jig must be disassembled.

Clearly, what is needed is a drill jig compatible for use with an automated fixture which is capable of drilling bores to tight tolerances and with minimal run-out without the need for additional, time-consuming reaming steps. Ideally, such a jig should also provide for the easy and rapid changing of a worn drill with a new one. Finally, such a jig should be compatible for use with integrally formed drills that do not require the installation of Morse tapers or special coupling components.

SUMMARY OF THE INVENTION

Generally speaking, the invention is a drill jig assembly that overcomes the aforementioned shortcomings associated with the prior art. To this end, the drill jig assembly of the invention comprises a drill having a shank that includes a cylindrical pilot portion, a chuck that preferably includes a hydraulically-operated collet for detachably gripping the end of the drill shank, a housing tube for slidably supporting the chuck, and a drill guide mounted on the housing tube and having a pilot bore for rotatably receiving the cylindrical shank portion of the drill. The pilot bore of the guide advantageously maintains a pilot concentric alignment between the guide and the shank portion during a drilling operation.

The drill guide may include a carbide bushing having a pilot bore and a cylindrical exterior in concentric alignment with the bore. An end cap may also be provided for securing the bushing in concentric alignment around the end of the housing tube. In the preferred embodiment, the end cap includes an annular body having an inner surface that is shrink fitted in concentric alignment around the cylindrical exterior of the bushing, and an outer surface that is threaded for concentrically securing the end cap around a distal end of the housing tube. Preferably, the pilot portion of the drill shank is integrally formed with the cutting tip and fluted portion of the drill so as to further enhance concentricity between the drill and the bushing of the drill guide and minimize run-out in the holes bored by the drill.

The drill jig assembly of the invention may further include a drive mechanism for rotating the chuck in the form of a spindle connected to the output shaft of a motor and having a distal end connected to the chuck. The feed assembly of the drive mechanism may include a screw thread on the exterior of the spindle which is engaged to an inner diameter screw thread in a gear rotatably driven by the motor. The motor may be reversible so as to rotate and advance or rotate and retract the spindle.

The housing tube may include access slots for allowing the system operator to tighten or loosen the hydraulically-operated collet of the chuck, thereby expediting the changing of drills in the assembly. A set screw may be provided at the end of the hydraulically-operated collet to provide some degree of axial adjustment between the drill shank and the chuck so that bores of the same depth may be produced regardless of small variations in the lengths of the drills used The use of a chuck slidably and rotatably supported by a guide tube and having a hydraulically-operated collet that applies a uniform gripping force around the end of the drill shank, in combination with the highly accurate concentric alignment achieved between the pilot bore of the carbide bushing and pilot portion of the drill shank results in a drill jig assembly capable of accurately drilling holes to very tight tolerances in a one-step, advance and retract drilling operation. The use of a hydraulically-operated chuck further allows worn drills to be quickly and easily changed without the need for disassembling the jig. The provision of an adjustable set screw at the end of the hydraulically-operated collet of the chuck conveniently allows for an axial extension adjustment of the drill within the jig to compensate for the shortening of drill tips caused by sharpening operations. Finally, the use of integrally formed drills further enhances the concentricity achieved by the jig and lowers manufacturing costs.

BRIEF DESCRIPTION OF THE DRAWINGS

FIG. 2 is an enlarged, exploded view of the jig assembly illustrated in FIG. 1A in the vicinity of the distal end of the housing tube;

FIG. 3A is a front view of the hydraulic chuck used in the drill jig assembly of the invention;

FIG. 3B is a partial cross-sectional side view of the hydraulically-operated chuck illustrated in FIG. 3A turned 90° counterclockwise, and FIGS. 4 and 5 illustrate the operation of the drill jig assembly in rotating and extending a drill through a workpiece.

DETAILED DESCRIPTION OF THE PREFERRED EMBODIMENT

Figures 1A, 1B:
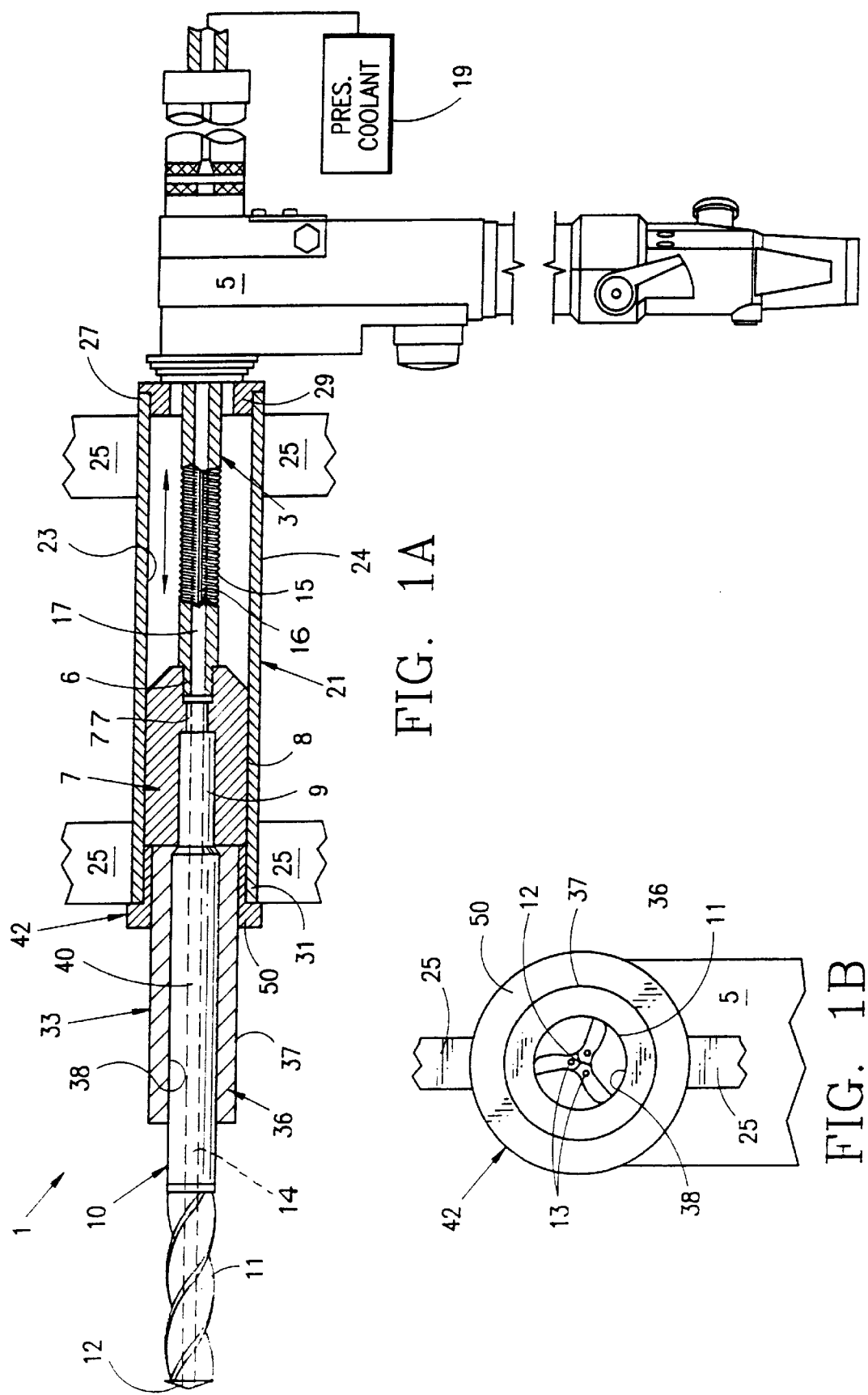
FIG. 1A is a side cross-sectional view of the drill jig assembly of the invention.
FIG. 1B is a front view of the drill jig assembly illustrated in FIG. 1A.

With reference now to FIGS. 1A and 1B, wherein like numbers represent like components throughout all of the several Figures, the drill jig assembly 1 of the invention generally comprises a rotatable drive spindle 3 connected on one side to a motor 5 (which is preferably a reversible air motor) and having a distal end 6 coupled to a hydraulic chuck 7.

In the preferred embodiment, chuck 7 is a Model No. A9.99-000434 hydraulic chuck manufactured by Kennametal Inc. located in Latrobe, Pa. Such a chuck 7 has a cylindrical outer surface 8 machined to slide-fit within the housing tube of the jig assembly 1, described in more detail hereinafter. The chuck 7 detachably grips the end of a shank 9 of a drill 10. The drill 10 includes a fluted body 11 that extends beyond the shank 9 and ends in a boring tip 12. As is best seen in FIG. 1B, boring tip 12 includes three coolant holes 13 for distributing a mist-typed coolant that flows through a centrally disposed passageway 14 (shown in phantom in FIG. 1A) in the drill 10.

The drive spindle 3 has a threaded exterior 15 that includes four keyway slots 16 (only one of which is shown). The air motor 5 includes two separate gears (not shown), one of which includes a threaded inner diameter that engages the threaded exterior 15 of the spindle 3 in order to advance and retract it, and another having teeth along its outer diameter that engage the keyway slots 16 of the spindle 3 in order to impart rotational torque. An air motor 5 having such gear train is commercially available in the form of a Model No. 230-QGDA-RAC-SU-MS Quackenbush type air motor manufactured by Intool, Inc., located in Houston, Tex. Drive spindle 3 further includes a coolant bore 17 that is coaxial with the coolant passageway 14 of the drill 10. The distal end of the drive spindle 3 is connected to a source of pressurized, mist-typed coolant 19 as shown for conveying coolant through the passageways 17 and 14 and out through the drill tip opening 13 during a drilling operation.

The drill jig assembly 1 further includes the previously-mentioned housing tube 21. The cylindrical interior 23 of the housing tube 21 is closely dimensioned to the outer diameter of the hydraulic chuck 7 such that the chuck 7 is supported in part by the tube 21 when the drill jig assembly 1 is horizontally oriented as shown in FIG. 1A. The sliding and rotational support that the housing tube 21 gives to the exterior of the chuck 7 minimizes cantilever loads on the end of the drill shank 9 which could result in undesirable amounts of run-out during a drilling operation. The housing tube 21 further includes a cylindrical exterior 24 which is connected to a mounting fixture 25 (shown only partially in FIG. 1A). The mounting fixture 25 may be automated, and orients the drill jig assembly 1 with respect to a workpiece in order to drill a bore of a desired diameter and depth. The proximal end 27 of the housing tube 21 is connected to the air motor 5 by means of a screw-type coupling 29. The distal end 31 of the housing tube 21 is connected to the drill guide 33.

With reference now to FIGS. 1A and 2, the drill guide 33 is formed from a carbide bushing 36 having a cylindrical outer surface 37 and a concentrically aligned pilot bore 38 around its inner surface. Pilot bore 38 rotatably supports a pilot portion 40 of the drill shank 9. To this end, the inner diameter d1 of the pilot bore 38 is very closely dimensioned to the outer diameter d2 of the pilot portion 40 of drill shank 9. In order to insure a minimum of run-out, the length of the pilot portion 40 of the drill shank 9 should be at least as long as the stroke length of the rotatable drive spindle 3, and the length of the carbide bushing 36 should be dimensioned such that at least 30% of the pilot portion 40 of the shank 9 is rotatably supported by the pilot bore 38 at all times during a boring operation.

An end cap 42 secures the carbide bushing 36 in place over the distal end 31 of the housing tube 21. End cap 42 includes an annular body having an interior 44 which is shrink-fitted around the cylindrical outer surface 47 of the carbide bushing 36 to insure a tight and accurate fit. The annular body also includes a threaded exterior 46 which is engagable within an internal thread 48 that circumscribes the inner diameter of distal end 31 of the tube 21. End cap 42 is provided with a stop ring 50 for limiting the extent to which the threaded exterior 46 of the annular body may be screwed into the thread 48 of the tube 21. As is evident in FIG. 2, the housing tube 21 further includes an access slot 52 for a purpose which will become more evident hereinafter.

With reference now to FIGS. 3A and 3B, the hydraulic chuck 7 includes a cylindrical chuck body 55 having the aforementioned cylindrical exterior 8. The proximal end of the chuck body 55 includes a threaded bore for receiving the distal end 6 (of reduced diameter) of the drive spindle 3. A pair of opposing brass set screws 59a,b mounted in threaded bores 61a,b secure the distal end 6 to the threaded bore 57 of chuck body 55. Chuck 7 further includes a clamping bore 62 concentrically aligned with the axis of rotation of the cylindrical chuck body 55. Clamping bore 62 includes a hydraulic collet assembly 63 formed from a flexible gripping tube 65 surrounded by a hydraulic expansion chamber 67. A passageway 67 for conducting hydraulic fluid connects the annular hydraulic expansion chamber 67 with a pressure piston 71. A screw head 73 is provided on the pressure piston 71 for either pressurizing or depressurizing the fluid within the hydraulic expansion chamber 67 to either grip or to release the end of the drill shank 9. A set screw 77 engaged in an axially-oriented threaded hole 79 is provided at the bottom of the clamping bore 62. Set screw 77 conveniently allows the system operator to adjust the extent to which the end of the drill shank 9 may be inserted into the clamping bore 62. This is an important feature, as the length of the drill 9 becomes slightly shorter every time it is sharpened. Accordingly, in order to drill holes of the same depth without making major adjustments within the other components of the drill jig assembly 1, all that is necessary is to turn the set screw 77 counterclockwise via the allen head socket 81. While not specifically shown in FIG. 3B, set screw 77 includes an axially-oriented passageway for conducting pressurized coolant from the coolant bore 17 of the rotatable drive spindle 3 to the coolant passageway 14 of the drill 9.

FIGS. 4 and 5 illustrate the operation of the drill jig assembly with respect to a workpiece 83. In operation, the fixture 25 positions the housing tube 21 so that the boring tip 12 of the drill shank 9 is oriented along the center line of a desired bore site. The air motor 5 is then actuated in order to both rotate and advance the drill 9 toward the workpiece 83. If the workpiece 83 is formed from or includes a layer of titanium, the drill 9 is rotated at a speed of no more than about 350 rpm since localized friction can cause titanium to ignite. The pitch of the threaded exterior 15 of the rotatable drive spindle 3 advances the drill 9 at the desired feed rate. At the same time, the source of pressurized coolant provides a pressurized mist coolant from the proximal end of the spindle 3 through the coolant holes 13 located in the drill tip 12. Under such conditions, the drill tip 12 can cleanly cut through the workpiece 83 and produce a high tolerance bore 85 in a single-step operation. Upon completion of the boring operation, the direction of the output shaft of the air motor 5 is reversed, and the drill 10 is retracted back into the position illustrated in FIG. 4. When the drill tip 12 becomes dull, it is a simple matter for the system operator to simply loosen the screw head 3 of the pressure piston 71 by extending an appropriate wrench through the access slot 52 of the housing tube 21. The drill 10 is then either resharpened or replaced with a new drill. If resharpened, the system operator turns set screw 81 an appropriate amount to compensate for the loss of length of the drill 10 due to the removal of material from the drill tip 12. The system operator then tightens the screw head 73 of the pressure piston 71, and resumes the boring operation.

While this invention has been described with respect to a single preferred embodiment, various additions and modifications will become apparent to those of ordinary skill in the art. All such variations and modifications are intended to be encompassed within the scope of this patent, which is limited only by the claims appended hereto.

What is claimed is:

1. A drill jig assembly for accurately supporting a drill having a shank including a cylindrical portion relative to a workpiece, comprising:
   a chuck for detachably gripping said drill shank;
   a housing tube for slidably supporting said chuck; and
   a drill guide mounted on said housing tube and having a pilot bore for rotatably receiving said cylindrical shank portion of the drill and maintaining a pilot concentric alignment between said guide and said shank portion during a drilling operation, wherein said chuck includes a set screw disposed within said collet for adjusting an axial extent to which said drill shank is inserted into said collet.

2. The drill jig assembly as defined in claim 1, wherein said chuck includes a hydraulically-operated collet for applying a concentrically uniform gripping force around said drill shank and for allowing a quick change of drills.

3. The drill jig assembly as defined in claim 1, wherein said drill guide includes a bushing having said pilot bore.

4. The drill jig assembly as defined in claim 3, wherein said drill guide includes means for securing said bushing to said distal end of said housing tube.

5. The drill jig assembly as defined in claim 1, wherein at least some of said cylindrical portion of said drill shank is a pilot portion that fits into said bore of said guide to within pilot tolerances.

6. The drill jig assembly as defined in claim 1, wherein said shank is integrally formed with said drill to enhance concentricity between said shank and a boring end of said drill.

7. The drill jig assembly as defined in claim 1, further comprising a drive means for rotating said chuck.

8. The drill jig assembly as defined in claim 7, wherein said drive means includes a feed assembly for advancing and retracting said drill with respect to a workpiece.

9. The drill jig assembly as defined in claim 8, wherein said drive means includes a rotatable spindle connected to a motor and having an end connected to said chuck and including an exterior screw thread engaged to a screw thread driven by said motor for rotating, advancing, and retracting said drill.

10. The drill jig assembly as defined in claim 3, wherein said bushing of said drill guide is formed from a cemented carbide material.

11. A drill jig assembly for accurately supporting a drill relative to a workpiece, comprising:
    a drill having a shank that includes a free end and a cylindrical portion;
    a chuck having a circular exterior and a hydraulically-operated collet for detachably gripping the free end of the drill shank, said chuck including a set screw disposed within said collet for adjusting an axial extent to which said drill shank is inserted into said collet;
    a housing tube for slidably and rotatably receiving said circular exterior of said chuck; and
    a drill guide mounted on a distal end of said housing tube and having a pilot bore for rotatably receiving said cylindrical shank portion of said drill and maintaining a pilot concentric alignment between said bore and said shank portion during a drilling operation.

12. The drill jig assembly as defined in claim 11, wherein said drill guide includes a carbide bushing having said pilot bore, and a cylindrical exterior in concentric alignment with said bore.

13. The drill jig assembly as defined in claim 12, wherein said drill guide includes an end cap for securing said bushing to said housing tube, said end cap having an annular portion shrink fitted in concentric alignment around said concentric exterior of said bushing.

14. The drill jig assembly as defined in claim 13, wherein at least some of said cylindrical portion of said drill shank is a pilot portion that fits into said bore of said guide to within pilot tolerances.

15. The drill jig assembly as defined in claim 11, wherein said shank is integrally formed with said drill to enhance concentricity between said shank and a boring end of said drill.

16. The drill jig assembly as defined in claim 11, further comprising a drive means for rotating said chuck.

17. The drill jig assembly as defined in claim 16, wherein said drive means includes a feed assembly for advancing and retracting said drill with respect to a workpiece.

18. The drill jig assembly as defined in claim 17, wherein said drive means includes a rotatable spindle connected to a motor and having a free end connected to said chuck.

19. The drill jig assembly as defined in claim 18, wherein said feed mechanism of said drive means includes a screw thread surrounding the exterior of said spindle and a stationary nut mounted on said motor, wherein said motor is reversible in rotational direction.

20. A drill jig assembly for accurately supporting a drill relative to a workpiece, comprising:
- a drill having a shank that includes a free end and a cylindrical portion, at least some of said cylindrical portion of said drill shank is a pilot portion that fits into said bore of said guide to within pilot tolerances;
- a chuck having a circular exterior and a hydraulically-operated collet for detachably gripping the free end of the drill shank, said chuck including a set screw disposed within said collet for adjusting an axial extent to which said drill shank is inserted into said collet;
- a housing tube for slidably and rotatably receiving said circular exterior of said chuck; and
- a drill guide mounted on a distal end of said housing tube and having a pilot bore for rotatably receiving said cylindrical shank portion of said drill and maintaining a pilot concentric alignment between said bore and said shank portion during a drilling operation.

* * * * *